A. DE LA BARRE.
STEERING DEVICE FOR AUTOMOBILES.
APPLICATION FILED JAN. 10, 1918.
1,301,137.
Patented Apr. 22, 1919.
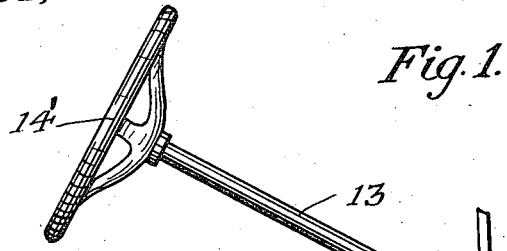
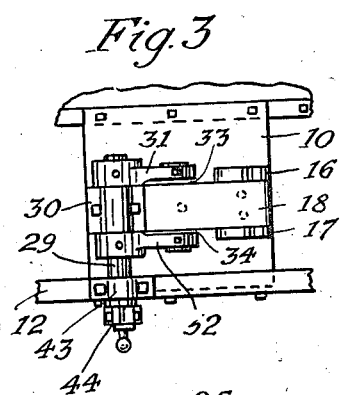
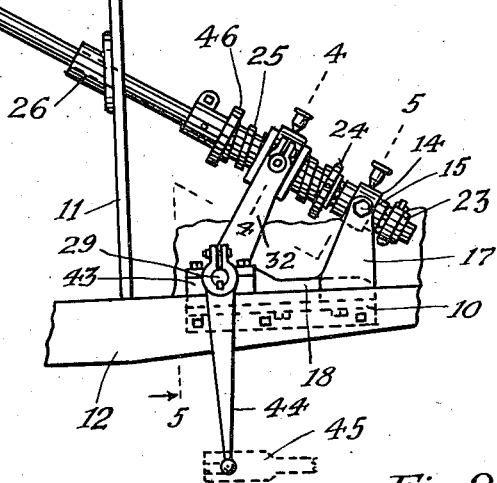
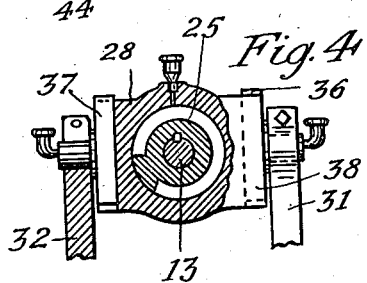
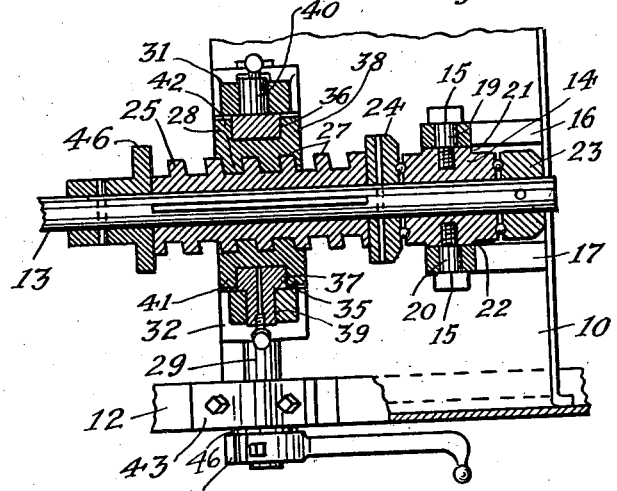
Inventor:
Alfred de LaBarre
By
his Attorney.

UNITED STATES PATENT OFFICE.

ALFRED DE LA BARRE, OF MINNEAPOLIS, MINNESOTA.

STEERING DEVICE FOR AUTOMOBILES.

1,301,137. Specification of Letters Patent. Patented Apr. 22, 1919.

Application filed January 10, 1918. Serial No. 211,123.

*To all whom it may concern:*

Be it known that I, ALFRED DE LA BARRE, a citizen of the United States, residing at Minneapolis, in the county of Hennepin and State of Minnesota, have invented certain new and useful Improvements in Steering Devices for Automobiles, of which the following is a specification.

My invention relates to steering devices for automobiles and has for its object to provide improved means whereby the operator can guide the vehicle with the least effort or strength while at the same time automatically locking the wheels in any required position. It is a principal object of my invention to provide such a construction that the vibration of the parts caused by the jolting of the vehicle and the action of the engine will not interfere with the perfect operation thereof, the construction and arrangement of the parts when assembled being such that any stress or vibration applied to any of its parts will be sustained independently of each other. This result is accomplished by permitting the steering-shaft to oscillate in a vertical plane although merely through a small angle while at the same time permitting the steering shaft to rotate for the purpose of guiding the vehicle.

The full objects and advantages of my invention will appear in connection with the detailed description thereof and are particularly pointed out in the claims.

In the drawings, illustrating the application of my invention in one form,—

Figure 1 is a side elevational view of my invention showing the same applied to the dash and side frame member of an automobile, parts of the frame member being broken away. Fig. 2 is a longitudinal sectional plan view, on an enlarged scale, showing the relation and arrangement of the transmission parts. Fig. 3 is a plan view of the means for supporting the steering shaft. Fig. 4 is a cross sectional view, on an enlarged scale, taken on line 4—4 of Fig. 1. Fig. 5 is a front elevational view with parts broken away, showing a cross sectional view of the steering shaft and sleeve taken on line 5—5 of Fig. 1.

My invention, as shown, is mounted upon a plate 10 secured in front of dash 11 to side frame member 12 of an automobile. The steering knuckles and connecting rods form no part of the invention of this application and the details thereof are therefore not shown.

A steering shaft 13 rotated by a hand wheel 14' is rotatably journaled in a sleeve 14 which is pivoted by bolts 15 in lugs 16 and 17 formed expressly for that purpose and which are integral parts of a supporting casting 18 securely fastened to plate 10. The lugs 16 and 17 have holes 19 and 20 which serve as bearings for bolts 15 acting as pivots. The sleeve 14 is provided with shoulders 21 and 22 which fit between lugs 16 and 17 which are so spaced as to allow the sleeve 14 to oscillate freely but not to slide longitudinally. A portion of the steering shaft 13 extends beyond the sleeve 14 and has rigidly pinned thereon a collar or washer 23 which in conjunction with a collar 24, subsequently to be described, prevents the steering shaft 13 from sliding longitudinally but permits it to rotate freely. Ball bearings arranged between members 23, 14 and 24 will give easy rotation of the shaft 13. The shaft 13 is also supported in a sleeve 26 on dash 11 which keeps it in proper position as shown in Fig. 1. The steering shaft 13 carries a worm 25 keyed thereto the threads 27 of which engage the threads of an internally threaded worm nut 28, which, together with the parts now to be described, form the transmission elements which actuate the connecting rods and steering knuckles. A shaft 29 journaled in the bearing 30 in supporting casting 18 has rigidly attached thereto a pair of arms 31 and 32 identical in form and which extend in the same plane passing through the axial center of shaft 29. Arms 31 and 32 are each provided with shoulders 33 and 34, respectively, which project against sides of the bearing 30. By this arrangement the arms are held spaced apart so as to straddle the worm 25 and also prevent lateral motion of the shaft 29 but permit the same to oscillate freely. The arms 31 and 32 have connection with the worm 25 by means of a pair of followers 35 and 36 adapted to slide along grooves 37 and 38 in worm nut 28 in the direction of the length of the arms 31 and 32. Followers 35 and 36 are provided with trunnions 39 and 40 of such size as to provide shoulders 41 and 42 which hold the followers in the grooves. Trunnions 39 and 40 are journaled in suitable bearings in arms 31 and 32. The shaft 13 has secured to it a collar 46 which together with the collar 24 limits the range of movement of worm nut 28 in either direction. Shaft 29 also has a bearing 43 in side frame member 12 and a portion of the shaft 29 extending over the side frame member has a crank 44 keyed thereto extending downwardly. Crank 44 has a shoulder 46 which projects against the side of the bearing 43.

From the foregoing it will be readily apprehended that as the steering shaft 13 is rotated the threads of the worm 25 engage the threads of the worm nut 28 and the same is propelled either backward or forward. By this movement of the worm nut oscillatory movement is given to the shaft 29 through arms 31 and 32 and the wheels of the vehicle are tilted by the longitudinal motion given to connecting rod 45 through arm 44. It will also be seen that any shift within the limits determined by the length of the worm may be obtained, and furthermore the use of the worm and worm nut renders the steering gear self-locked in whatever position it is left.

The advantages of my invention will be apparent. The steering shaft is rotatably supported at two points with the force applied between the points of support. The steering shaft itself is subjected to practically no strain or shock. Any forces applied to the shaft usually are taken longitudinally of the shaft and therefore do not tend to distort or loosen the connection with the steering mechanism. Largely increased turning power is provided because of the relative long lever arm running to the point of application of power by means of a worm. This insures a graduated and certain turning of the steering wheels so easily that it can be effected with one hand under practically all conditions of service. Shocks arising from striking of obstacles or dropping into depressions by the front wheels are carried directly to the frame and do not tend to disturb the steering mechanism.

I am aware that various modifications of my invention may be made without departing from the scope thereof and I do not wish to be limited to the precise detail construction and arrangement of parts herein shown.

I claim:

1. A steering device for motor vehicles comprising a steering shaft, a support for the lower end of said shaft, means for horizontally pivoting said shaft to said support to permit both rotary and oscillating movements of said shaft, a member movable along said shaft upon rotation of the latter, and connections between said movable member and the steering wheels whereby the latter may be placed in any desired steering position.

2. A steering device for motor vehicles comprising a steering shaft, a sleeve in which the lower end of said shaft is journaled, a support to which said sleeve is horizontally pivoted, a member movable along said shaft upon rotation of the latter and connections between said movable member and the steering wheels whereby the latter may be placed in any desired steering position.

3. A steering device for motor vehicles comprising a steering shaft, a support in which the lower end of said shaft is journaled, a worm on said shaft, a single nut surrounding and threaded upon said worm so that rotation of said shaft will move said nut along said shaft, said nut being formed with grooves in opposite sides thereof, followers slidable in said grooves, arms pivoted at their upper ends to said followers, a shaft to which the lower ends of said arms are secured, a crank arm secured at one end to said last mentioned shaft, and a connecting rod pivotally attached to the other of said crank arm.

In testimony whereof I hereunto affix my signature.

ALFRED de LA BARRE.